United States Patent
Kawakubo et al.

(10) Patent No.: US 6,780,945 B2
(45) Date of Patent: Aug. 24, 2004

(54) PROCESS FOR PRODUCING VINYL CHLORIDE POLYMERS

(75) Inventors: Toshihiko Kawakubo, Kashima-gun (JP); Tadashi Amano, Kashima-gun (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 142 days.

(21) Appl. No.: 10/087,821

(22) Filed: Mar. 5, 2002

(65) Prior Publication Data

US 2002/0169268 A1 Nov. 14, 2002

(30) Foreign Application Priority Data

Mar. 5, 2001 (JP) ....................................... 2001-060158

(51) Int. Cl.⁷ ................................................ C08F 14/06
(52) U.S. Cl. ...................... 526/89; 526/344; 526/344.2; 524/503
(58) Field of Search ..................... 526/89, 344, 344.2; 524/503

(56) References Cited

U.S. PATENT DOCUMENTS 4,230,843 A * 10/1980 Coleman .................... 526/204
5,314,530 A * 5/1994 Wierer et al. .................. 106/2

OTHER PUBLICATIONS

U.S. patent application Ser. No. 10/754,567, Usuki et al., filed Jan. 12, 2004.

U.S. patent application Ser. No. 10/087,821, Kawakubo et al., filed Mar. 5, 2002.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

A process for polymerizing vinyl chloride or a monomer mixture containing vinyl chloride in an aqueous medium in a polymerization vessel fitted with a reflux condenser, characterized by starting to add (A) an anti-foam agent, and (B) a partially saponified polyvinyl alcohol with an average degree of polymerization of 100 to 500 and a saponification degree of 75 to 85 mole %, to a reaction mixture during the operation of said reflux condenser, and continuing the addition of (A) and (B) until recovery of unreacted monomers from said polymerization vessel is completed, thereby preventing the polymer slurry from foaming, rising, or scattering during polymerization or recovery of unreacted monomers.

10 Claims, No Drawings

PROCESS FOR PRODUCING VINYL CHLORIDE POLYMERS

BACKGROUND OF THE INVENTION

1. Field of the Invention

The present invention relates to a process for producing a vinyl chloride polymer, comprising polymerizing vinyl chloride or a monomer mixture comprised of mainly vinyl chloride in a polymerization vessel fitted with a reflux condenser, and in particular to a process for producing a vinyl chloride polymer improved in the composition of a reaction system and the addition timing for additives in order to prevent foaming when reaction heat is removed by means of the reflux condenser or when unreacted monomers are recovered.

2. Description of the Prior Art

In recent years, in the production processes for a vinyl chloride polymer, for the purpose of improving the production efficiency, it is now attempted to enlarge the size of a polymerization vessel and to reduce polymerization time. As a method of reducing the polymerization time, it is performed to fit a polymerization vessel with a reflux condenser to improve heat removal efficiency in attempt to reduce time. As another method it is performed to increase recovery rate for unreacted monomers after completion of polymerization in attempt to reduce the time for the monomer recovery.

However, increase of heat removed by the reflux condenser or increase of the unreacted monomer recovery rate results in increase of degree of vacuum at the gas phase section in a polymerization vessel, so that vaporization of vinyl chloride monomer or the like dissolved in a slurry is accelerated. Consequently, foam generation is increased, the foam is accumulated on the surface of the liquid, and then the foam rises, thereby causing a phenomenon (carry-over) wherein polymer particles reach the upper part of the polymerization vessel. In a serious instance, the carry-over will reach the inside of a reflux condenser and around the inlet of an unreacted monomer recovery pipe provided for a polymerization vessel, resulting in that the polymer particles are deposited as scale not only on the upper part of the polymerization vessel but also inside a reflux condenser and around the inlet (recovery port) of the unreacted monomer recovery pipe. The scale deposition like this not only causes a big impediment to a production process such as maintenance after polymerization, but also adversely affects the quality of polymer products, such as causing fish eyes (FE) in the resulting polymeric products, if the subsequent polymerization is carried out with use of the polymerization as it is.

As described above there have been quite limitations on the use of a reflux condenser, it cannot be said that the functions of a reflux condenser are sufficiently utilized.

Heretofore, for the purpose breaking foam at the gas phase section in a polymerization vessel, there are proposed a method of conducting polymerization while stirring the gas phase section by means of rotating blades (see Japanese Post-examination Patent Publication (kokoku) 60-42804), and a method of spraying water or a foam-controlling agent over foam using spray nozzles such as flat nozzle, a full-cone nozzle, or the like (Japanese Post-examination Patent Publication (kokoku) 50-30106).

These methods bring about a certain level of anti-foaming effects; however, the effects are not sufficient. Therefore, it is expected that a further improved anti-foaming technology is developed.

As one of the methods is known a method in which an anti-foaming agent is added during polymerization. However, the use of the anti-foaming agent only provides insufficient foam-breaking effects. The increase of the quantity of the anti-foaming agent to enhance the foam-breaking effects, results in a problem of scale deposition, and therefore the quantity of the anti-foaming agent is naturally limited.

SUMMARY OF THE INVENTION

It is an object of the present invention to provide a process for producing a vinyl chloride polymer which can certainly prevent the polymer slurry from foaming, rising, and scattering during polymerization or recovery of unreacted monomers, and can make a reflux condenser exhibit its heat-removing effects fully, and can recover unreacted monomers efficiently.

A process for producing a vinyl chloride polymer according to the present invention, comprises polymerizing vinyl chloride or a monomer mixture comprised of mainly vinyl chloride in an aqueous medium in a polymerization vessel fitted with a reflux condenser, said process comprising:

starting to add (A) an anti-foam agent, and (B) a partially saponified polyvinyl alcohol with an average degree of polymerization of 100 to 500 and a saponification degree of 75 to 85 mole % to a polymerization system during the operation of said reflux condenser, and continuing the addition of (A) and (B) stated above until the completion of recovery of unreacted monomers from said polymerization vessel.

DETAILED DESCRIPTION OF THE PREFERRED EMBODIMENTS

In the following, the process of producing a vinyl chloride polymer according to the present invention is described in detail.

Vinyl chloride or a monomer mixture comprised mainly of vinyl chloride is polymerized in an aqueous medium in a polymerization vessel fitted with a reflux condenser in a manner conventionally known. The polymerization method which may be used includes, for example, suspension polymerization method and emulsion polymerization method, but the effects of the present invention are exhibited more greatly particularly by the use of the suspension polymerization method.

The monomer to be polymerized includes not only vinyl chloride singly but also a mixture comprised of vinyl chloride as a main monomer (in an amount of not less than 50% by weight, and especially not less than 70% by weight) and a vinyl monomer (comonomer) copolymerizable with vinyl chloride. The comonomer which may be copolymerized with the vinyl chloride includes, for example, vinyl esters such as vinyl acetate, vinyl propionate; acrylic esters or methacrylic esters such as methyl acrylate, ethyl acrylate; olefins such as ethylene, propylene, or the like; vinyl ethers such as lauryl vinyl ether, isobutyl vinyl ether or the like; maleic anhydride; acrylonitrile; styrene; vinylidene chloride, and other monomers copolymerizable with vinyl chloride.

A polymerization initiator which is normally added to said polymerization system may be any oil-soluble catalysts or water-soluble catalysts which have been conventionally used in polymerization of vinyl chloride or the like. The oil-soluble catalysts include, for example, percarbonate compounds such as diisopropyl peroxydicarbonate, di-2-ethylhexyl peroxydicarbonate, and diethoxyethyl peroxydicarbonate; perester compounds such as t-butyl peroxyneodecanate, t-butyl peroxypivalate, t-hexyl peroxypivalate, and α-cumyl peroxyneodecanate; peroxides such as acetyl cyclohexyl sulfonyl peroxide, 2,4,4-trimethylpentyl-2-peroxy phenoxy acetate, 3,5,5-trimethylhexanoyl peroxide and lauroyl peroxide; and azo compounds such as azobis-2,4-dimethylvaleronitrile, and azobis(4-methoxy-2,4-dimethylvaleronitrile). The water-soluble catalysts include, for example, potassium persulfate, ammonium persulfate, hydrogen peroxide, and cumene hydroperoxide. These oil-soluble catalysts or the water-soluble catalysts can be used singly or in combination of two or more kinds.

The dispersing agent which accelerates dispersion of said monomer(s) in the aqueous medium may be any of those which have been conventionally known in general, and includes, for example, water-soluble cellulose ethers such as methyl cellulose, ethyl cellulose, hydroxyethyl cellulose, hydroxypropyl cellulose, and hydroxypropylmethyl cellulose; acrylic polymers; water-soluble polymers such as gelatin, water-soluble or oil-soluble partially saponified polyvinyl alcohols; oil-soluble emulsifiers such as sorbitan monolaurate, sorbitan trioleate, sorbitan monostearate, glycerol tristearate, and ethylene oxide-propylene oxide block copolymers; water-soluble emulsifiers such as polyoxyethylene sorbitan monolaurate, polyoxyethylene glycerol oleate, and sodium lauryl sulfate; calcium carbonate, calcium phosphate, and sodium dodecylbenzene sulfonate. These can be used singly or in combination of two or more kinds.

To said reaction system can be optionally added a polymerization regulator, a chain transfer agent, a pH adjuster, a gelation improver, an antistatic agent, a cross-linking agent, a stabilizer, a filler, an antioxidant, a buffering agent, a scale preventive agent, etc. which have been optionally used as necessary in the polymerization of a vinyl chloride system.

Other conditions for the polymerization, and methods for charging aqueous medium, vinyl chloride monomer, other optional comonomers or the like into the polymerization vessel may be the same as used conventionally, and the polymerization conditions such as the composition of these materials, polymerization temperature, etc. may also be the same.

In the present invention, (A) an anti-foam agent, and (B) a partially saponified polyvinyl alcohol with an average degree of polymerization of 100 to 500 and a saponification degree of 75 to 85 mole % are added to the reaction system (polymerization system) described above. The addition is started with the start of operation of the reflux condenser, and continued until the completion of the unreacted monomer recovery.

The anti-foaming agent of the component (A) includes, for example, silicone anti-foaming agents; polyalkylene glycol-based anti-foaming agents such as polyoxyethylene, polypropylene oxide copolymers, and acetylene glycol; amide anti-foaming agents such as polyalkylene amide, etc. The silicone anti-foaming agents include, for example, silicone fluids such as dimethylpolysiloxane, dlphenylpolysiloxane, emulsified products of these, and these compounds in which a fine powder of silica, alumina or the like has been dispersed uniformly.

Out of the anti-foaming agents above, preferred is a silicone anti-foaming agent.

The polyvinyl alcohol of the component (B) has an average degree of polymerization of 100 to 500 and a saponification degree of 75 to 85 mole %, and preferably an average degree of polymerization of 260 to 320 and a saponification degree of 78 to 82 mole %.

The anti-foaming agent of the component (A) is added preferably in an amount of 10 to 500 ppm, more preferably 20 to 300 ppm, on a weight basis in terms of solid matter relative to the entire monomers. The polyvinyl alcohol of the component (B) is added preferably in an amount of 100 to 1500 ppm, more preferably 150 to 1300 ppm, on a weight basis relative to the entire monomers. It is to be noted that these amounts are the total amounts of the materials added from the start of the addition through the completion thereof.

The additives of (A) and (B) are required to be added continuously during the operation of the reflux condenser and during the recovery of unreacted monomers. If they are added in a lump, the effects of preventing the polymer slurry from foaming or scattering may not be maintained until the completion of the polymerization or until the completion of the unreacted monomer recovery.

If the anti-foaming agent (A) to be added is too small in quantity, it is difficult to allow the foam-breaking effects to exhibit sufficiently. On the other hand, however, the amount thereof is too large, not only the increased amount will result in an economical disadvantage but also scale becomes more liable to be deposited on the wall surfaces of the polymerization vessel, and fish eyes may increase.

If the amount of said polyvinyl alcohol (B) is too small, sufficient anti-foaming effects cannot be exhibited. On the other hand, however, the amount thereof is too large, not only the increased amount will result in an economical disadvantage but also foams due to the dispersant may increase to thereby lower the foam-breaking effects.

Incidentally, the completion of polymerization and the processing after the completion can be carried out according to the known ways.

According to the present invention as described above, if the heat quantity removed by the reflux condenser and/or the recovery rate for the unreacted monomers are increased, the foaming, rising and scattering of the polymer slurry can be effectively prevented. Consequently, not only the heat-removing effects by the reflux condenser can be obtained sufficiently, but also polymer deposition or scale deposition at the upper part of the polymerization vessel, at the inside of the reflux condenser, in the pipes for recovering unreacted monomers and so forth can be prevented. Thus, a vinyl chloride polymer of high quality with decreased fish eyes can be produced.

Action

Foam generated during polymerization or recovery of unreacted monomers (hereinafter, referred to as polymer slurry foam) is formed of a complex combination of bubbles caused by polyvinyl alcohol or a cellulose dispersant used as a dispersing agent (hereinafter, referred to as dispersing agent's bubbles) and bubbles formed by incorporation of vinyl chloride polymer powder into the dispersing agent's bubbles (polymer bubbles). If either of the bubbles are controlled, the polymer slurry foam cannot be prevented sufficiently. The situation is entirely different from that of the system consisting of a dispersing agent and water only where foam can be sufficiently broken with an anti-foaming agent such as a silicone anti-foaming agent.

Since the foam generated in a polymer-containing system incorporating a large quantity of a polymer therein, the foam film has gotten harder and therefore the foam is more stable.

That is, when a polymer slurry which has been decreased in surface activities due to polyvinyl alcohol or a cellulose dispersing agent added before initiation of polymerization foams, the dispersing agent's bubbles will disappear relatively easily but the polymer bubbles hardly disappear and remain as they are. This is because polymer powder contained in the slurry attaches to bubbles generated in the slurry and accumulates in the upper part of the liquid section. In the upper part of the liquid section where the polymer powder accumulates, the effects of breaking foam which is supplied successively are weakened, and therefore foam is gradually accumulated. Presumably, when foam is accumulated, further polymer is accumulated thereon. Thus, accumulation is repeated, resulting in troubles like carry-over finally.

In the present invention, on the other hand, the dispersing agent's bubbles are broken with said anti-foaming agent (A); and the polymer is attached to the bubbles caused by monomer gas generated in the slurry by use of the partially saponified polyvinyl alcohol having a good affinity with the polymer and water, and the polymer accumulated at the upper part of the foam can be returned into the liquid section, so that the bubbles of the polymer slurry can be broken simultaneously. Thus, the foam by the respective dispersing agents and the foam by the polymer can be broken simultaneously, so that generation of foam of the polymer slurry and rising of the foam can be controlled sufficiently.

If the partially saponified polyvinyl alcohol (B) is not used in combination with said anti-foaming agent (A) but is used singly, no effects are exhibited but foam generation becomes active to the contrary.

The effects of the partially saponified polyvinyl alcohol are reduced gradually after addition thereof and lost 20 minutes after the addition. Therefore, said anti-foaming agent (A) and the partially saponified polyvinyl alcohol (B) are required to be added continuously.

EXAMPLES

In the following, examples of the present invention will now be described specifically, but the present invention is not limited to the examples described herein. Vinyl chloride monomer is sometimes abbreviated "VC".

Examples 1 and 2, and Comparative Examples 1 to 5

In every example, a stainless steel-made polymerization vessel with an inner capacity of 2,000 L fitted with a stirring device and a jacket was charged with 900 kg of a deionized water, 390 g of a partially saponified polyvinyl alcohol with a polymerization degree of 1,500 to 2,700 and a saponification degree of 75 to 85 mole %, and tert-butyl peroxyneodecanate in an amount indicated in Table 1 or Table 2 given below. Subsequently, said polymerization vessel was evacuated internally to 8.0 kPa (60 mmHg), and then 600kg of vinyl chloride monomer was charged. The temperature was allowed to rise (or polymerization was initiated) by passing hot water through the jacket with stirring the inside of the polymerization vessel.

At the time when the internal temperature had reached 57° C. after the initiation of heating, the internal temperature was maintained at 57° C., so that the polymerization proceeded. At the time of 80 minutes after the initiation of the temperature rise, a reflux condenser was started to operate and heat quantity removed in each example was controlled to the value as given in Table 1 or Table 2. Unreacted monomers were started to be recovered at the time when the polymerization was completed, and the recovery was carried out under the conditions of a recovery flow rate given in Table 1 and Table 2 and over a time given in Table 1 or Table 2. The polymerization was deemed to had completed when the pressure inside the polymerization vessel fell down to 0.588 MPa.G (6.0 kgf/cm$^2$.G).

The additives (A) and (B) used here are as follows.

Anti-foaming agent (A): a silicone anti-foaming agent comprising dimethylpolysiloxane.

Additive (B): a partially saponified polyvinyl alcohol with an average polymerization degree of 280 and a saponification degree of 80 mole %.

The additives, the entire quantities thereof, and the addition time in each example are as described in Table 1 and Table 2.

In each example, after the completion of the polymerization, the polymer slurry was taken out of the vessel, dehydrated, and dried, to obtain a vinyl chloride polymer.

Regarding each example, estimation and measurements were made for polymer scale deposition, carry-over into the reflux condenser, carry-over into the unreacted monomer recovery port, size distribution of the resulting polymeric product, plasticizer-take up, fish eye generation, bulk specific gravity, volume resistivity, anti-initial discoloration, and thermal stability. The results are given in Table 3 and Table 4 below.

The estimation and measurements are conducted in the following methods.

<Observation of Polymer Scale Deposition State>

The state of polymerization scale deposition after the completion of polymerization was observed with naked eyes, and was estimated with the three ranks. Incidentally, the observation of scale was performed after two or more polymerization runs were finished.

O: No polymer scale deposition is observed, and the inner wall of the polymerization vessel has luster of a metallic mirror surface.

X: Polymer scale deposition was observed on a part of the metallic mirror surface of the polymerization vessel inner surface.

<Carry-over into a Reflux Condenser>

Observation was performed with naked eyes after the completion of the unreacted monomer recovery, and the results were evaluated according the criterion:

O: No deposition of vinyl chloride polymer is observed at the lower part of the condenser;

X: Deposition of vinyl chloride polymer is observed at the upper part of the condenser.

<Carry-over into Unreacted Monomer Recovery Port>

Observation was performed with naked eyes after the completion of the unreacted monomer recovery, and the results were evaluated according the criterion:

O: No deposition of vinyl chloride polymer is observed at the unreacted monomer recovery port inside the polymerization vessel;

X: Deposition of vinyl chloride polymer is observed at the port and in the pipe for recovering unreacted monomers.

<Particle Size Distribution>

A specimen was screened using the sieves of #60, #100, #150 and #200 according to JIS Z-8801, and proportions (% by weight) of each fraction having passed each sieve were measured.

<Plasticizer Take-up>

On the bottom of an aluminum alloy-made container with an inner diameter of 25 mm and a depth of 85 mm, glass fiber was filled, 10 g of a specimen was added therein, and then 15 mL of dioctyl phthalate (DOP) was added thereto. For 30 minutes was left to stand the container to allow the DOP to permeate into the specimen sufficiently. Thereafter, an excess of DOP was separated centrifugally from the specimen under an acceleration of 1,500 G. The quantity of the DOP absorbed by the specimen was measured as a proportion by weight % with respect to the weight of the specimen prior to absorption of DOP.

<Fish Eye Generation State>

To 100 parts by weight of a specimen, were added 50 parts by weight of DOP, 0.1 part of barium stearate, 0.1 part by weight of cadmium stearate, 0.8 part by weight of cetanol, 2.0 part by weight of a tin-based stabilizer, 0.5 part by weight of titanium oxide, and 0.1 part of carbon black. The resulting mixture was mixed and kneaded at 140° C. for 5 minutes using a 6 inch roller mill to mold it into a sheet with a thickness of 0.3 mm. Number of white transparent particles (fish eyes) per 100 $cm^2$ of the sheet was counted.

<Bulk Specific Gravity>

Measurement was performed according to JIS K-6723.

<Volume Resistivity>

Measurement was performed according to JIS K-6723.

Incidentally, measurements of the particle size distribution, plasticizer take-up, fish eyes, bulk specific gravity, thermal stability, volume resistivity, and anti-initial discoloration were performed for a vinyl chloride polymer product obtained at the second batch polymerization of polymerization batches conducted twice, wherein a single batch consists of charging raw and other materials, polymerizing, recovering unreacted monomers, taking out a slurry, etc.

<Anti-initial Discoloration>

To 100 parts by weight of a vinyl chloride polymer obtained, were added 1 part by weight of tin laurate, 0.5 part by weight of a cadmium-based stabilizer, and 50 parts by weight of dioctyl phthalate. The mixture was kneaded at 160° C. for 5 minutes using a two-roller mill to mold it into a sheet with a thickness of 0.8 mm. Subsequently, the sheet was cut and placed in layers in a frame measuring 4×4×1.5 cm, and molded under heating at 160° C. and a pressure of 6.4 to 6.9 MPa (65–70 kgf/$cm^2$) to obtain a specimen for measurement. The specimen was measured for luminosity index L in the Hunter's color difference equation described in JIS Z 8730 (1980) using a photoelectric calorimeter (supplied by Nippon Denshoku Industries Co., Ltd.) and value a and value b are measured.

<Thermal Stability>

The same sheet with a thickness of 0.8 mm as molded for measurement of anti-initial discoloration was placed in an oven heated at 185° C., and time taken until the specimen became black was measured.

TABLE 1

|  |  | Example 1 | Example 2 | Comparative Example 1 |
|---|---|---|---|---|
| Initiator | ppm | 740 | 740 | 740 |
| Polymerization time |  | 4 H | 4 H | 4 H |
| Condenser heat removal (Mcal/H) |  | 120 | 120 | 120 |
| Unreacted VC recovery rate ($Nm^3$/min) |  | 1.2 | 1.2 | 1.2 |
| Time required for unreacted VC recovery (min.) |  | 40 | 40 | 40 |
| Additive (A) | ppm | 100 | 100 | None |
|  | Charge start | 140 min. after polymerization initiation | 140 min. after polymerization initiation |  |
|  | Charge end | At the time of completion of Unreacted monomer recovery | At the time of completion of Unreacted monomer recovery |  |
| Additive (B) | ppm | 200 | 1200 | None |
|  | Charge start | 140 min. after polymerization initiation | 140 min. after polymerization initiation |  |
|  | Charge end | At the time of completion of Unreacted monomer recovery | At the time of completion of Unreacted monomer recovery |  |

TABLE 2

|  |  | Comparative Example 2 | Comparative Example 3 | Comparative Example 4 | Comparative Example 5 |
|---|---|---|---|---|---|
| Initiator | ppm | 740 | 640 | 740 | 740 |
| Polymerization time |  | 4 H | 4 H 30 M | 4 H | 4 H |
| Condenser heat removal (Mcal/H) |  | 120 | 100 | 120 | 120 |
| Unreacted VC recovery rate ($Nm^3$/min) |  | 1.2 | 1.2 | 1.2 | 1.2 |
| Time required for unreacted VC recovery (min.) |  | 40 | 40 | 40 | 40 |
| Additive (A) | ppm | 100 | None | 100 | 600 |
|  | Charge start | At the time of polymerization initiation |  | 140 min. after polymerization initiation | 140 min. after polymerization initiation |
|  | Charge end | At the time of completion of Unreacted monomer recovery |  | At the time of completion of Unreacted monomer recovery | At the time of completion of Unreacted monomer recovery |
| Additive (B) | ppm | 200 | 200 | None | None |
|  | Charge start | At the time of polymerization initiation | 140 min. after polymerization initiation |  |  |
|  | Charge end | At the time of completion of Unreacted monomer recovery | At the time of completion of Unreacted monomer recovery |  |  |

TABLE 3

|  |  | Example 1 | Example 2 | Comparative Example 1 |
|---|---|---|---|---|
| Carry-over into reflux condenser | | ○ | ○ | X |
| Carry-over into unreacted VC recovery port | | ○ | ○ | X |
| Scale deposition | | ○ | ○ | X |
| Particle size distribution | #60 pass | 100 | 100 | 100 |
| | #100 pass | 51.0 | 52.3 | 51.4 |
| | #150 pass | 8.2 | 8.5 | 8.3 |
| | #200 pass | 0.5 | 0.4 | 0.4 |
| plasticizer take-up % | | 23.0 | 22.8 | 22.9 |
| Bulk specific gravity g/ml | | 0.532 | 0.533 | 0.531 |
| Anti-initial discoloration | L | 70.7 | 70.5 | 70.6 |
| | a | −1.5 | −1.5 | −1.5 |
| | b | 10.3 | 10.2 | 10.2 |
| Thermal stability | min. | 63 | 63 | 60 |
| Number of fish eyes m$^{-2}$ | | 0 | 0 | 30 |
| Volume resistivity × 10$^{13}$ Ω cm | | 12.5 | 12.3 | 11.8 |

TABLE 4

|  |  | Comparative Example 2 | Comparative Example 3 | Comparative Example 4 | Comparative Example 5 |
|---|---|---|---|---|---|
| Carry-over into reflux condenser | | X | X | X | X |
| Carry-over into unreacted VC recovery port | | X | X | X | X |
| Scale deposition | | X | X | X | X |
| Particle size distribution | #60 pass | 100 | 100 | 100 | 100 |
| | #100 pass | 52.1 | 51.5 | 52.0 | 51.8 |
| | #150 pass | 8.4 | 8.3 | 8.2 | 8.3 |
| | #200 pass | 0.5 | 0.5 | 0.4 | 0.5 |
| Plasticizer take-up % | | 22.9 | 23.1 | 23.2 | 23.1 |
| Bulk specific gravity g/ml | | 0.533 | 0.532 | 0.533 | 0.532 |
| Anti-initial discoloration | L | 70.5 | 70.6 | 70.6 | 70.5 |
| | a | −1.5 | −1.4 | −1.5 | −1.5 |
| | b | 10.3 | 10.3 | 10.2 | 10.2 |
| Thermal stability | min. | 63 | 63 | 60 | 60 |
| Number of fish eyes m$^{-2}$ | | 35 | 28 | 32 | 33 |
| Volume resistivity × 10$^{13}$ Ω cm | | 12.1 | 12.4 | 11.8 | 11.6 |

As seen from Tables 1 and 2, and Tables 3 and 4, in the processes of producing a vinyl chloride polymer of Example 1 and Example 2 of the present invention, either of carry-over into the reflux condenser, carry-over into the unreacted monomer recovery port, and scale generation hardly occurred, and the obtained polymers had excellent properties such as volume resistivity as compared to those of Comparative Examples 1–5.

Especially, it is understandable that if both of the anti-foaming agent (A) and the polyvinyl alcohol (B) are added, at the same time when the polymerization is initiated as in Comparative Example 2, it is impossible to obtain good anti-foaming effects.

As described in detail above, according to the present invention, if heat removal by a reflux condenser is increased or if the rate of recovering unreacted monomers is increased, foaming of the polymer slurry, and rising or scattering of the foam to the upper part of the gas section, can be prevented. There is no bad influence on the production process. Accordingly, polyvinyl chloride polymers of uniform quality, especially with few fish eyes, and good volume resistivity can be produced with a high productivity; thus markedly great industrial effects being obtained.

What is claimed is:

1. A process for producing a vinyl chloride polymer, comprising conducting polymerization of vinyl chloride or of a monomer mixture comprised of mainly vinyl chloride in an aqueous medium in a polymerization vessel fitted with a reflux condenser, said process comprising:

initiating the polymerization of the monomers;

starting the operation of said reflux condenser to remove heat generated by the polymerization, conducting recovery of unreacted monomers from said polymerization vessel after the completion of said polymerization, and starting the continuous addition of (A) an anti-foam agent, and (B) a partially saponified polyvinyl alcohol with an average degree of polymerization of 100 to 500 and a saponification degree of 75 to 85 mole % to the polymerization mixture in said polymerization vessel during the operation of said reflux condenser, and continuing the addition of (A) and (B) stated above until the completion of the recovery of unreacted monomers.

2. The process according to claim 1, wherein said anti-foaming agent of the component (A) is a silicone anti-foaming agent, a polyalkylene glycol-based anti-foaming agent, or an amide anti-foaming agent.

3. The process according to claim 2, wherein said anti-foaming agent of the component (A) is a silicone anti-foaming agent.

4. The process according to claim 1, wherein said polyvinyl alcohol of the component (B) has an average degree of polymerization of 260 to 320 and a saponification degree of 78 to 82 mole %.

5. The process according to claim 1, wherein said anti-foaming agent of the component (A) is added in an amount of 10 to 500 ppm on a weight basis in terms of solid matter relative to the entire monomers.

6. The process according to claim 1, wherein said polyvinyl alcohol of the component (B) is added in an amount of 100 to 1500 ppm on a weight basis relative to the entire monomers.

7. The process according to claim 1, wherein said polymerization is carried out as suspension polymerization or emulsion polymerization.

8. The process according to claim 1, wherein said monomer mixture is comprised of vinyl chloride and other vinyl monomer copolymerizable with vinyl chloride.

9. The process according to claim 8, wherein said other vinyl monomer is selected from the group consisting of vinyl esters, acrylic esters, methacrylic esters, olefins, vinyl ethers, maleic anhydride, acrylonitrile, styrene, and vinylidene chloride.

10. The process according to claim 4 wherein said polyvinylalcohol of the component (B) is added in an amount of 100 to 1500 ppm on a weight basis relative to the entire monomers and said component (A) is a silicone anti-foaming agent added in an amount of 10–500 ppm on a weight basis in terms of solid matter relative to the entire monomers.

* * * * *